United States Patent [19]

Assmann et al.

[11] Patent Number: 4,578,229

[45] Date of Patent: Mar. 25, 1986

[54] METHOD FOR THE MANUFACTURE OF OXIDIC SINTERED NUCLEAR FUEL BODIES

[75] Inventors: Helmut Assmann, Dormitz; Gerhard Dichtjär, Langenselbold; Wolfgang Dörr; Georg Maier, both of Herzogenaurach; Viktor Mathieu, Neuberg; Martin Peehs, Bubenreuth, all of Fed. Rep. of Germany

[73] Assignee: Kraftwerk Union Aktiengesellschaft, Mulheim (Ruhr), Fed. Rep. of Germany

[21] Appl. No.: 436,303

[22] Filed: Oct. 25, 1982

[30] Foreign Application Priority Data

Oct. 26, 1981 [DE] Fed. Rep. of Germany ....... 3142447

[51] Int. Cl.$^4$ ............................................. G21C 21/00
[52] U.S. Cl. ................................. 264/0.5; 252/637; 252/639; 252/643; 423/261
[58] Field of Search ............... 264/0.5; 252/643, 637, 252/639; 423/260, 261

[56] References Cited

U.S. PATENT DOCUMENTS

| | | | |
|---|---|---|---|
| 3,194,852 | 7/1965 | Lloyd et al. | 264/0.5 |
| 3,927,154 | 12/1975 | Carter | 423/261 X |
| 4,053,559 | 10/1977 | Hart et al. | 423/261 |
| 4,348,339 | 9/1982 | Assmann et al. | 264/0.5 |

FOREIGN PATENT DOCUMENTS

| | | | |
|---|---|---|---|
| 2855166 | 12/1978 | Fed. Rep. of Germany | 264/0.5 |
| 47-01011 | 1/1972 | Japan | 423/260 |
| 970735 | 9/1964 | United Kingdom | 423/261 |

OTHER PUBLICATIONS

"Solid State Communications", vol. 5, pp. 349-352, 1967, Pergamon Press, Great Britain.
"Le Journal de Physique", vol. 25, pp. 431-439, 1964.

*Primary Examiner*—Teddy S. Gron
*Assistant Examiner*—Virginia B. Caress
*Attorney, Agent, or Firm*—Herbert L. Lerner; Laurence A. Greenberg

[57] ABSTRACT

Method for the manufacture of oxidic nuclear fuel bodies by a heat treatment of blanks obtained from $UO_2$ starting power or a mixture of $UO_2$ and $PuO_2$ starting powder at a treatment temperature in the range of 1000° C. to 1400° initially in a gas atmosphere with oxidizing action and subsequently in a gas atmosphere with reducing action. The oxygen potential of the gas atmosphere with oxidizing action is kept in a range in which a crystallographically demonstrable $U_4O_9$ or $(U, Pu)_4O_9$ crystal phase is generated in the blanks during the heating to the treatment temperature in this gas atmosphere with oxidizing action.

16 Claims, No Drawings

METHOD FOR THE MANUFACTURE OF OXIDIC SINTERED NUCLEAR FUEL BODIES

BACKGROUND OF THE INVENTION

1. Field of the Invention

The invention relates to a method for the manufacture of oxidic sintered nuclear fuel bodies by a heat treatment of blanks obtained from $UO_2$ starting powder or a mixture of $UO_2$ and $PuO_2$ starting powder at a temperature in the range of 1000° C. to 1400° C. in a gas atmosphere which initially has oxidizing action and subsequently reducing action.

2. Description of the Prior Art

Such a method is known from German Published Non-Prosecuted Application No. 28 55 166. In this method, the blanks are obtained by compacting nuclear fuel powder which, for adjusting the micro-structure, is reacted and mixed with grain size growth promoting sintering additives such as $U_3O_8$. Technically pure $CO_2$ is, for instance, used as the oxidizing gas atmosphere. The known method leads to oxidic sintered nuclear fuel bodies with a uniformly fine grain nuclear fuel oxide matrix in the micro-structure in which coarse islands are embedded only at the points which had originally been occupied by the grain growth promoting sintering additives. During the nuclear fission processes in the oxidic sintered nuclear fuel bodies in a nuclear reactor which is in operation, the sintered nuclear fuel bodies obtained in accordance with the known method liberate less gaseous or highly volatile nuclear fission products and are subjected to less post densification than sintered nuclear fuel bodies with an absolutely uniform micro-structure of very small grain size. Fuel rods which are filled with the sintered nuclear fuel bodies obtained by the known method therefore develop a smaller internal pressure in the cladding tube than fuel rods which are filled with oxidic sintered nuclear fuel bodies which have an absolutely uniform micro-structure of this small grain size.

SUMMARY OF THE INVENTION

An object of the invention is to improve the known method further and to provide oxidic sintered nuclear fuel bodies which liberate in a nuclear reactor which is in operation, even fewer gaseous or highly volatile nuclear fission products.

With the foregoing and other objects in view, there is provided in accordance with the invention a method for the manufacture of oxide nuclear fuel bodies by a heat treatment of blanks obtained from a nuclear fuel starting powder selected from the group consisiting of a $UO_2$ starting powder and a mixture of $UO_2$ and $PuO_2$ starting powder at a treatment temperature in the range of 1000° C. to 1400° C. initially in a gas atmosphere with oxidizing action and subsequently in a gas atmosphere with reducing action, the improvement including maintaining the oxygen potential of the gas atmosphere with oxidizing action in a range in which a crystallographically demonstrable $U_4O_9$ or $(U, Pu)_4O_9$ crystal phase is generated in the blanks during the heating to the treatment temperature in this gas atmosphere with oxidizing action for sufficient length of time to effect conversion of the nuclear fuel starting powder to the crystal phase.

Other features which are considered as characteristic for the invention are set forth in the appended claims.

Although the invention is illustrated and described herein as embodied in a method for the manufacture of oxidic sintered nuclear fuel bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

The method mentioned at the outset is characterized, according to the invention, by the features that the oxygen potential of the gas atmosphere with oxidizing action is kept in a range in which in the blanks a crystallographically demonstrable $U_4O_9$ or $(U, Pu)_4O_9$ crystal phase is generated during the heating up to the treatment temperature in this gas atmosphere with oxidizing action.

The crystallographic proof of the $U_4O_9$ or $(U, Pu)_4O_9$ phase can advantageously be conducted by determining the lattice constant in the treated blanks by means of X-ray diffractometry (see "Solid State Communications", Volume 5, Pages 349 to 352, 1967) or by Neutron Diffractometry (see "Le Jornal de Physique", Volume 25, Pages 431 to 439, 1964).

The oxygen potential is defined by the relationship $\Delta G_{O2} = RT \cdot \ln p_{O2}$ with R=general gas constant, T=absolute temperature and $p_{O2}$=the partial oxygen pressure in the gas atmosphere with oxidizing action.

The oxidic sintered nuclear fuel bodies obtained by the invention exhibit a micro-structure with uniformly distributed coarse grain which is stable against growth at the operating temperature in a nuclear reactor. Since grain boundary migration no longer occurs, gaseous or highly volatile nuclear fission products (for instance Xe, iodine) cannot be flushed to the outside from the nuclear fuel oxide matrix by migrating grain boundaries and build-up of an overpressure in the cladding tube of the fuel rod, in which the oxidic sintered nuclear fuel bodies are contained in the nuclear reactor. Since the blanks need not contain sintering additives with grain growth promoting action, an influence on the density of the sintered nuclear fuel bodies by such additives can be prevented.

In transferring the blanks into the $U_4O_9$ or $(U, Pu)_4O_9$ crystal phase, it is advantageous if these blanks are kept during the heating-up to the treatment temperature, in the gas atmosphere with oxidizing action for 15 minutes to two hours at a temperature in the range of 400° C. to 600° C.

The size and distribution of the coarse grain in the oxidic sintered nuclear fuel bodies can be advantageiously controlled by using blanks which contain, admixed to them, a supplementary substance which is thoroughly decomposed at a temperature in the range up to the treatment temperature, developing the composition products with reducing action. If the blanks contain this supplementary substance admixed only at certain places, for instance in a layer at the surface, the oxidic sintered nuclear fuel bodies obtained therefrom have fine grain at these points but are otherwise uniformly coarse-grained.

It is advantageous to use blanks which contain molybdenum sulfide, zinc stearate, polyvinyl alcohol and/or hydrocarbons admixed as the supplementary substance.

The oxidizing gas atmosphere which can advantageously be used is a mixture of $CO_2$ and air in the volume ratio in the range $10^5:1$ to $10^2:1$ and preferably about $10^3:1$, a mixture of $CO_2$ and $O_2$ in the volume ratio in the range of $5.10^5:1$ to $500:1$ and preferably about $5000:1$, or a mixture of $CO_2$ and inert gas, for instance a rare gas or nitrogen in the volume ratio in the range of $1:10^4$ to $1:10$ and preferably about $1:100$.

The development of a uniformly distributed coarse grain structure in the oxidic nuclear fuel bodies is promoted if the blanks are used with $UO_2$ starting powder, the specific surface of which is in the range of $3\ m^2/g$ to $50\ m^2/g$. It is advantageous if the specific surface of this $UO_2$ starting powder is in the range of $4\ m^2/g$ to $7\ m^2/g$.

It is furthermore advantageous if blanks are used with $UO_2$ starting powder, the mean crystallite size of which is less than $0.5\ \mu m$. Advantageously, this mean crystallite size is in the range of $0.2\ \mu m$ to $0.01\ \mu m$.

The invention and its advantages will be explained in greater detail by a comparison example and two embodiment examples:

In a comparison example, a blank compacted of $UO_2$ powder with a relatively large specific surface area of 6 $m^2/g$ and a mean crystallite size of about $0.075\ \mu m$ was used. The $UO_2$ powder used can be obtained by the so-called AUC-process which is described in "Gmelin Handbuch der Anorganischen Chemie, Uranium," Supplemental Volume A3, 1981, on Pages 101 to 104. The compacted blank was sintered in a sintering atmosphere consisting of a mixture of $CO_2$ and CO in the volume ratio of 10:1 at approximately 1 bar and 1100° C. for one hour. Subsequently, the sintered body produced from the blank was transferred while maintaining its temperature, into a hydrogen atmosphere of about 1 bar and was reduced there for 15 minutes at a reduction temperature of likewise 1100° C. After cooling down, the oxidic sintered nuclear fuel body obtained from the blank had a monomodal grain distribution with a grain size of 2 $\mu m$.

On a first embodiment example, a blank compacted from the same $UO_2$ powder as in the comparison example was first heated to 500° C. in a sintering atmosphere of about 1 bar consisting of a mixture of $CO_2$ and air in the volume ratio of 100:1 and kept at this temperature for about 30 minutes. During this time, the $UO_2$ of the blank was transferred completely into the pure $U_4O_9$ crystal phase. Then, heating of the blank was continued in the same sintering atmosphere to a sintering temperature of 1200° C. and sintered for one hour. Subsequently, the sintered body produced from this blank was transferred, while maintaining its temperature, into a hydrogen atmosphere of approximately 1 bar and reduced at a reduction temperature of likewise 1200° C. for 15 minutes. After cooling down, the oxidic sintered nuclear fuel body obtained from the blank likewise had a monomodal grain distribution, the grain size being 25 $\mu m$.

In a further embodiment example, a blank compacted from the same $UO_2$ powder as in the comparison example was saturated in a surface layer of 200 $\mu m$ thickness with oil as the hydrocarbon. Thereupon, this blank was heated in a sintering atmosphere at about 1 bar consisting of a mixture of $CO_2$ and air in the volume ratio of 500:1 to a sintering temperature of 1200° C. and sintered at this temperature for one hour. Then the sintered body produced from the blank was transferred, while keeping its temperature, into a hydrogen atmosphere of about 1 bar and reduced for 15 minutes at a reduction temperature of likewise 1200° C. After cooling down, a monomodal grain distribution was obtained in the surface layer saturated originally with oil as well as in the core of the oxidic sintered nuclear fuel body obtained from the blank; the grain size, however, was about 3 $\mu m$ in the surface layer but it was 23 $\mu m$ in the core.

The oxidic sintered nuclear fuel body obtained in accordance with the last-mentioned embodiment example has a better creeping capacity in the fine-grain surface layer. This prevents in an advantageous manner the mechanical interaction between the sintered nuclear body and the cladding tube of the fuel rod in which the sintered nuclear fuel body is contained during the operation in the nuclear reactor. Independently thereof, the coarse grain in the core of the sintered nuclear fuel body prevents the liberation of gaseous and highly volatile nuclear fission products.

The foregoing is a description corresponding to German Application P No. 31 42 447.3, dated Oct. 2, 1981, International priority of which is being claimed for the instant application, and which is hereby made part of this application. Any discrepancies between the foregoing specification and the aforementioned corresponding German application are to be resolved in favor of the latter.

There are claimed:

1. A method for the manufacture of oxidic nuclear fuel bodies comprising heat treating of blanks obtained from a nuclear fuel starting powder selected from thr group consisting of a $UO_2$ starting powder and a mixture of $UO_2$ and $PuO_2$ starting powder wherein the blanks are first heated in an oxidizing gas atmosphere containing a mixture of gases selected from the group consisting of $CO_2$ and air, $CO_2$ and $O_2$, and $CO_2$ and an inert gas, in a temperature range of 400° C. to 600° C. for 15 minutes to 2 hours while maintaining the gas atmosphere with oxidizing action to generate a crystallographically demonstrable $U_4O_9$ or $(U,Pu)_4O_9$ crystal phase in the blanks during the heating, and then are sintered in the same oxidizing atmosphere, in a treatment temperature range of 1000° C. to 1400° C., and finally are heated in a gas atmosphere with reducing action in a temperature range of 1000° C. to 1400° C. to produce an oxidic sintered nuclear fuel body which exhibits a micro-structure with uniformly distributed coarse grain which is stable against growth at the operating temperature in a nuclear reactor.

2. Method according to claim 1, wherein the blanks have admixed a supplementary substance which is thermally decomposed at a temperature in the range up to the treatment temperature.

3. Method according to claim 2, wherein the supplementary substance is a material selected from the group consisting of molybdenum sulfide, zinc stearate, polyvinyl alcohol and hydrocarbons.

4. Method according to claim 2, wherein the blanks contain the supplementary substance admixed only in a layer at the surface.

5. Method according to claim 1, wherein a mixture of $CO_2$ and air in a volume ratio in the range of $10^5:1$ to $10^2:1$ is used as the gas atmosphere with oxidizing action.

6. Method according to claim 5, wherein the ratio is about $10^3:1$.

7. Method according to claim 1, wherein a mixture of $CO_2$ and $O_2$ in the volume ratio in the range of $5.10^5:1$ to $500:1$ is used as the gas atmosphere with oxidizing action.

8. Method according to claim 7, wherein the ratio is about 5000:1.

9. Method according to claim 1, wherein a mixture of $CO_2$ and inert gas in the volume ratio in the range of $1:10^4$ to 1:10 is used as the gas atmosphere with oxidizing action.

10. Method according to claim 9, wherein the ratio is about 1:1000.

11. Method according to claim 1, wherein blanks with $UO_2$ starting powder are used, with a specific surface in the range of 3 m$^2$/g to 50 m$^2$/g.

12. Method according to claim 11, wherein blanks are used with $UO_2$ starting powder, with a specific surface in the range of 4 m$^2$/g to 7 m$^2$/g.

13. Method according to claim 11, wherein the $UO_2$ starting powder has a mean crystallite size of which is smaller than 0.5 μm.

14. Method according to claim 12, wherein the $UO_2$ starting powder has a mean crystallite size of which is smaller than 0.5 μm.

15. Method according to claim 13, wherein the $UO_2$ starting powder has a mean crystallite size in the range of 0.2 μm to 0.01 μm.

16. Method according to claim 14, wherein the $UO_2$ starting powder has a mean crystallite size in the range of 0.2 μm to 0.01 μm.

* * * * *